United States Patent
Raman (10) Patent No.: US 8,408,410 B2
(45) Date of Patent: Apr. 2, 2013

(54) REUSABLE DRINKING STRAW HOLDER WITH BOTTLE NECK SECURING ASSEMBLY

(76) Inventor: Erez Raman, San Rafael, CA (US)

( * ) Notice: Subject to any disclaimer, the term of this patent is extended or adjusted under 35 U.S.C. 154(b) by 471 days.

(21) Appl. No.: 12/691,481

(22) Filed: Jan. 21, 2010

(65) Prior Publication Data
US 2010/0181282 A1    Jul. 22, 2010

Related U.S. Application Data (60) Provisional application No. 61/146,275, filed on Jan. 21, 2009.

(51) Int. Cl.
*B65D 41/00* (2006.01)
*A47G 19/22* (2006.01)

(52) U.S. Cl. ........ 215/386; 215/387; 215/388; 215/229; 220/703; 220/705; 220/707; 220/708; 220/710

(58) Field of Classification Search ........... 215/229, 215/386, 387, 388, 389; 220/694, 703, 705, 220/707, 708, 709, 710
See application file for complete search history.

(56) References Cited

U.S. PATENT DOCUMENTS

| | | | | |
|---|---|---|---|---|
| 5,425,471 A | * | 6/1995 | Wendt | 220/705 |
| 5,823,422 A | * | 10/1998 | Collier et al. | 229/103.1 |
| 6,375,019 B1 | | 4/2002 | Hirota et al. | |
| 6,431,382 B1 | | 8/2002 | Li | |
| 6,929,135 B1 | * | 8/2005 | Hajianpour | 215/229 |
| 2009/0139952 A1 | | 6/2009 | Raman et al. | |

* cited by examiner

*Primary Examiner* — Anthony Stashick
*Assistant Examiner* — Madison L Poos
(74) *Attorney, Agent, or Firm* — Steven A. Nielsen; Allman & Nielsen, P.C.

(57) ABSTRACT

A straw holder 200 retains a drinking straw within a bottle such that the straw holder may be reused within other bottles. A plug section comprises a hollow funnel section 211 with an outer side and an inner area 212, with the outer side attaching to a top gasket member 204, a middle inner sealing member 205 and a lower guiding member 206, with the lower guiding member having means of centering the straw holder within the middle of a bottle, with the middle inner sealing member 205 having mean of contacting the inner wall area 402 of a neck section 401 of a bottle, and the top gasket member being configured to sit on top of a top lip 403 of a bottle.

7 Claims, 7 Drawing Sheets

REUSABLE DRINKING STRAW HOLDER WITH BOTTLE NECK SECURING ASSEMBLY

RELATED PATENT APPLICATION AND INCORPORATION BY REFERENCE

This is a utility application based upon U.S. patent application Ser. No. 61/146,275 entitled "System, device and method for using a straw with a beverage container," filed on Jan. 21, 2009. This related application is incorporated herein by reference and made a part of this application. If any conflict arises between the disclosure of the invention in this utility application and that in the related provisional application, the disclosure in this utility application shall govern. Moreover, the inventors incorporate herein by reference any and all patents, patent applications, and other documents hard copy or electronic, cited or referred to in this application or IDS.

BACKGROUND OF THE INVENTION (1) Field of the Invention

The invention relates to means and methods of securing drinking straw within a bottle. More particularly, the invention relates to a reusable straw holder suitable for integration with a straw and bottle cap and bottle neck assembly.

(2) Description of the Related Art

Several attempts to create a self-contained straw and straw retention system are known in the related art. For example, U.S. Pat. No. 6,375,019 issued to Hirota et al on Apr. 23, 2002 discloses a cylindrical plug system to hold a straw within a bottle. The plug member in Hirota fails to provide means of extracting the straw retaining assembly without destroying the assembly.

U.S. Pat. No. 6,431,382 issued to Li on Aug. 13, 2002 discloses a plug inserted into the top tip of a straw, with the plug being connected to a cap assembly. The plug piece may tear the upper portion of a straw during transit. The plug also adds difficulty and expense in manufacturing as gently inserting the plug into a straw is not a trivial task. Li also fails to provide easy means of resealing and covering an internal straw.

Both Hirota and Li fail to disclose means of drainage for fluid reaching the top portion of the cap, fail to disclose means of economically securing a straw within a bottle and fail to disclose a straw retention system suitable for easy extraction from a bottle and hence suitable for reuse in other bottles. Thus, there is room in the related art for the present invention.

BRIEF SUMMARY OF THE INVENTION

The present invention overcomes shortfalls in the related art by presenting an unobvious and unique combination and configuration of a straw holder member suitable for use and reuse, with novel means of venting and drainage and with other embodiments and features to efficiently contain a straw within a container.

In one aspect of the disclosed invention, a straw holder comprises a top gasket member, a middle inner sealing member and a lower guiding member. The top gasket member rests upon the top lip section of a bottle. The middle inner sealing member provides additional means of securing the straw holder to the inner neck of the bottle. The lower guiding member assists in the alignment of the straw holder within the bottle, such that the straw holder may be lightly and slightly inserted into the bottle and the motion of securing a cap upon the bottle will push the straw holder into is working position.

To facilitate proper air venting during consumption, the straw holder presents an upper air void, which is also useful for drainage in the event fluid reaches the cap section. A lower air void is found upon the lower section of the straw holder and is useful in drainage when and if fluid enters the interior section of the straw holder.

In an alternative embodiment the invention presents a center retention flap plug, for use over or under the retention component of the straw holder.

Reference Numerals in the Drawings.

- 10 one embodiment of the invention generally
- 100 top cap or bottle cap
- 101 shoulder section of cap
- 102 rest area for gasket member of straw holder
- 103 cap shelf plate for pressing bottle cap into gasket member of straw holder
- 104 lower break-away section of cap
- 105 break-away seam area of cap
- 106 flip cap
- 107 inner cap seal member
- 200 straw holder
- 201 plug section of straw holder
- 202 straw retention system of straw holder
- 203 lower "V" straw retainer section
- 204 top gasket member
- 205 middle inner sealing member
- 206 lower guiding member
- 207 main shaft of straw holder
- 208 sub-shaft of straw holder
- 209 upper air and fluid void on straw holder
- 210 lower fluid drainage void on straw holder
- 211 funnel section of straw holder
- 212 inner area of funnel section 211
- 213 lower tip of lower "V" straw retainer section 203
- 300 inner lower straw
- 301 outer upper straw
- 302 pleated area of outer upper straw
- 303 top sipping section of outer upper straw
- 304 flange ridge found at upper end of inner lower straw
- 305 lower lip of outer upper straw 301

-continued

Reference Numerals in the Drawings.

| | |
|---|---|
| 306 | resting position for lower lip 305 of outer upper straw |
| 400 | bottle |
| 401 | neck section of bottle or bottle neck section |
| 402 | inner wall area of bottle neck section |
| 403 | top lip of bottle |
| 500 | center retention flap plug or flap plugs |
| 501 | quarter flap of center retention flap plug |
| 502 | void area sometimes found between quarter flaps |
| 503 | outer ring of center retention flap plug |
| 504 | quarter flap holder |

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

Figures 1, 2, 3:
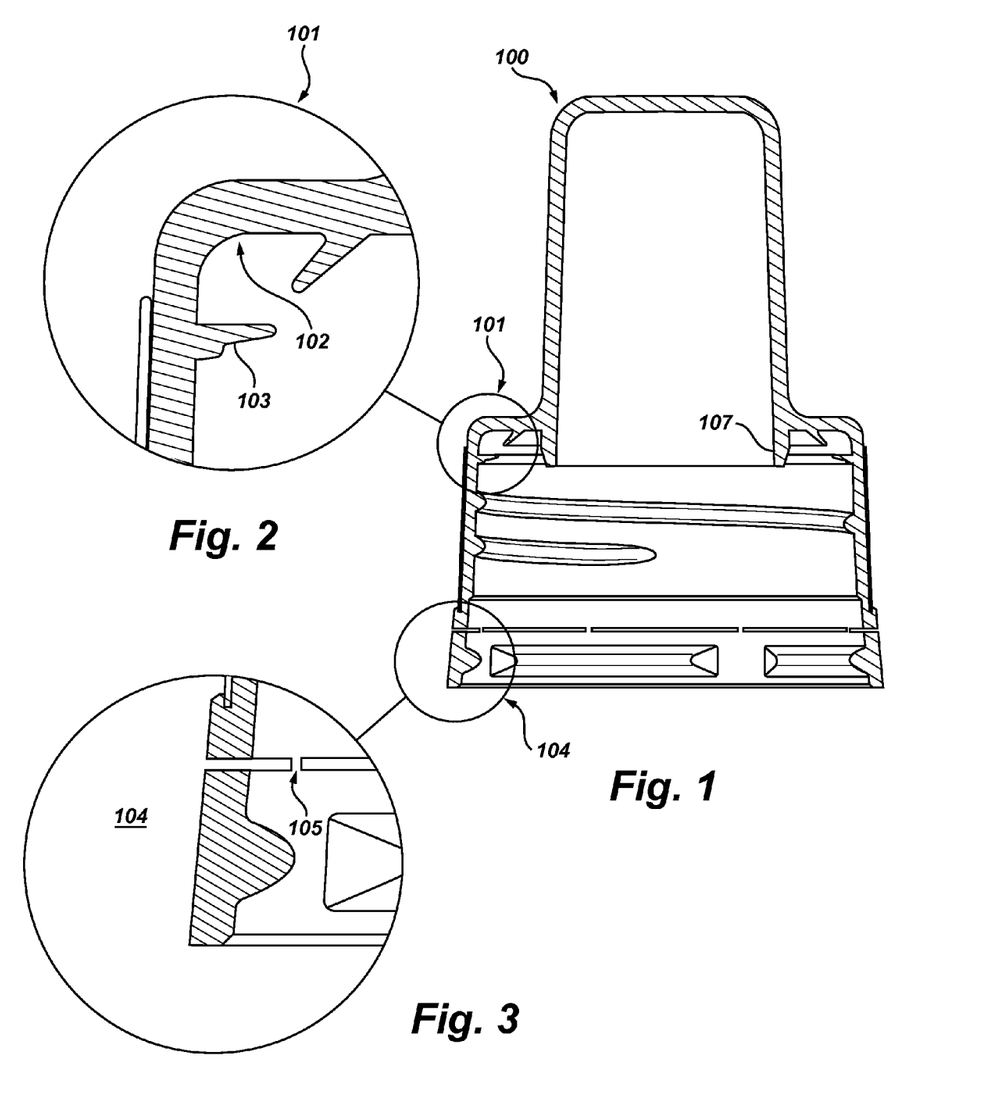
FIG. 1 is a sectional view of a cap fastened to a bottle.
FIG. 2 is an expanded sectional view from FIG. 1.
FIG. 3 is an expanded sectional view from FIG. 1.

Referring to FIG. 1 a cap 100 is shown in a sectional illustration with a shoulder section 101 and a lower breakaway section 104. FIG. 2 shows an expanded sectional view of the shoulder section and further illustrates a rest area 102 for the gasket member of the straw holder and the cap shelf plate 103. FIG. 3 features a break-away 105 section allowing the cap to be broken when opened.

FIG. 1 shows an inner cap seal member 107 which integrates with the inner area 212 of the funnel section to form a water tight seal.

Figure 4:
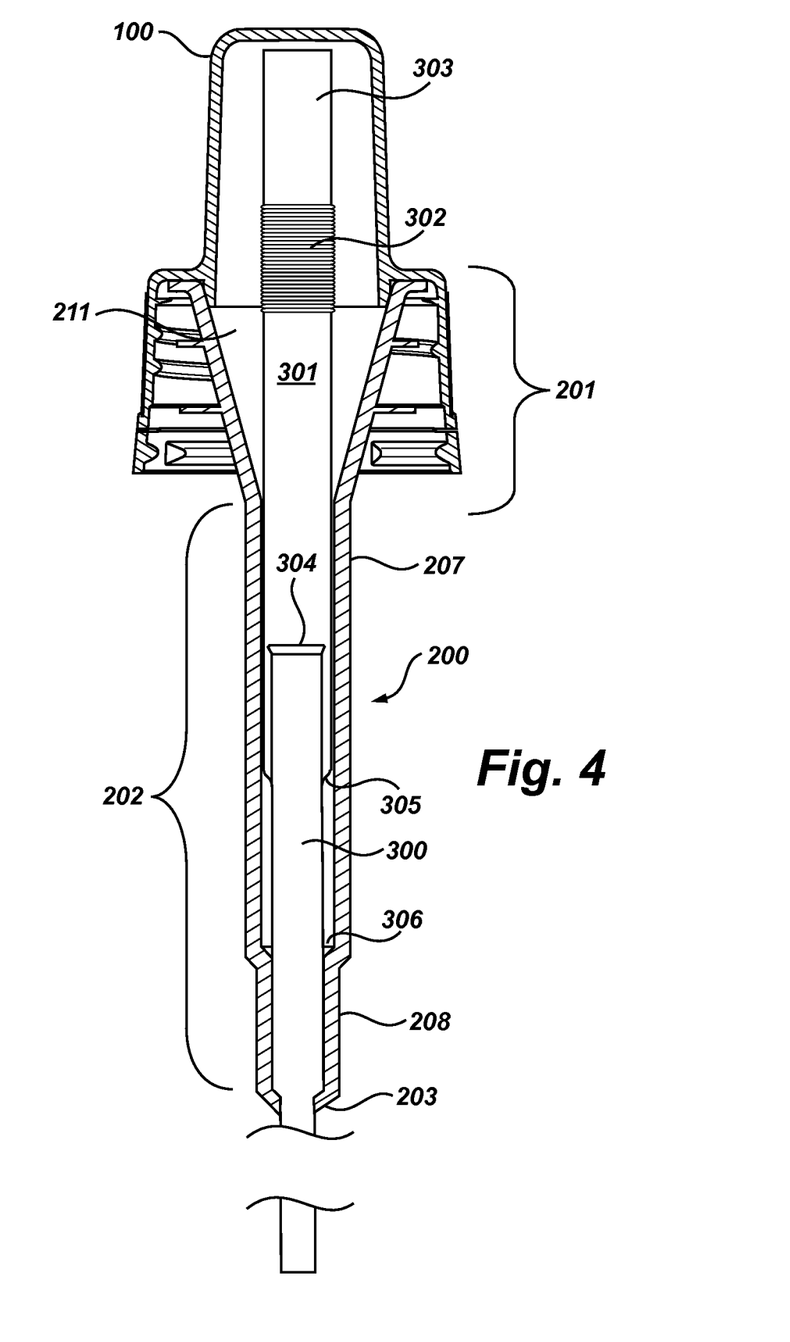
FIG. 4 is a sectional view of one embodiment of the invention used with a bottle cap.

Referring to FIG. 4, a top cap 100 is shown integrated or attached to the straw holder 200 with straw members 300 and 301 inserted into the straw holder. The plug section 201 of the straw holder is screwed into the cap 100. The plug section 201 of the straw holder includes a funnel section 211. The funnel section is attached to or leads to a straw retention system 202 of the straw holder. The straw retention system 202 includes a main shaft section 207 of the straw holder, a sub-shaft 208 and a lower "V" straw retainer section 203. The inner lower straw 300 is retained or restrained by the sub-shaft 208 and the lower "V" straw retainer 203 section of the straw holder 200. The outer upper straw 301 accepts the inner lower straw and includes a pleated section 302 and a top sipping section 303. A flange ridge 304 at the upper end of the outer upper straw 301 prevents the outer upper straw 301 from over extending and leaving the straw holder.

FIG. 4 shows the lower lip 305 of the outer upper straw. The lower lip is illustrated in a position above the lower lip's resting position 306 found at the juncture between the main shaft 207 and sub-shaft 208.

Figure 5:
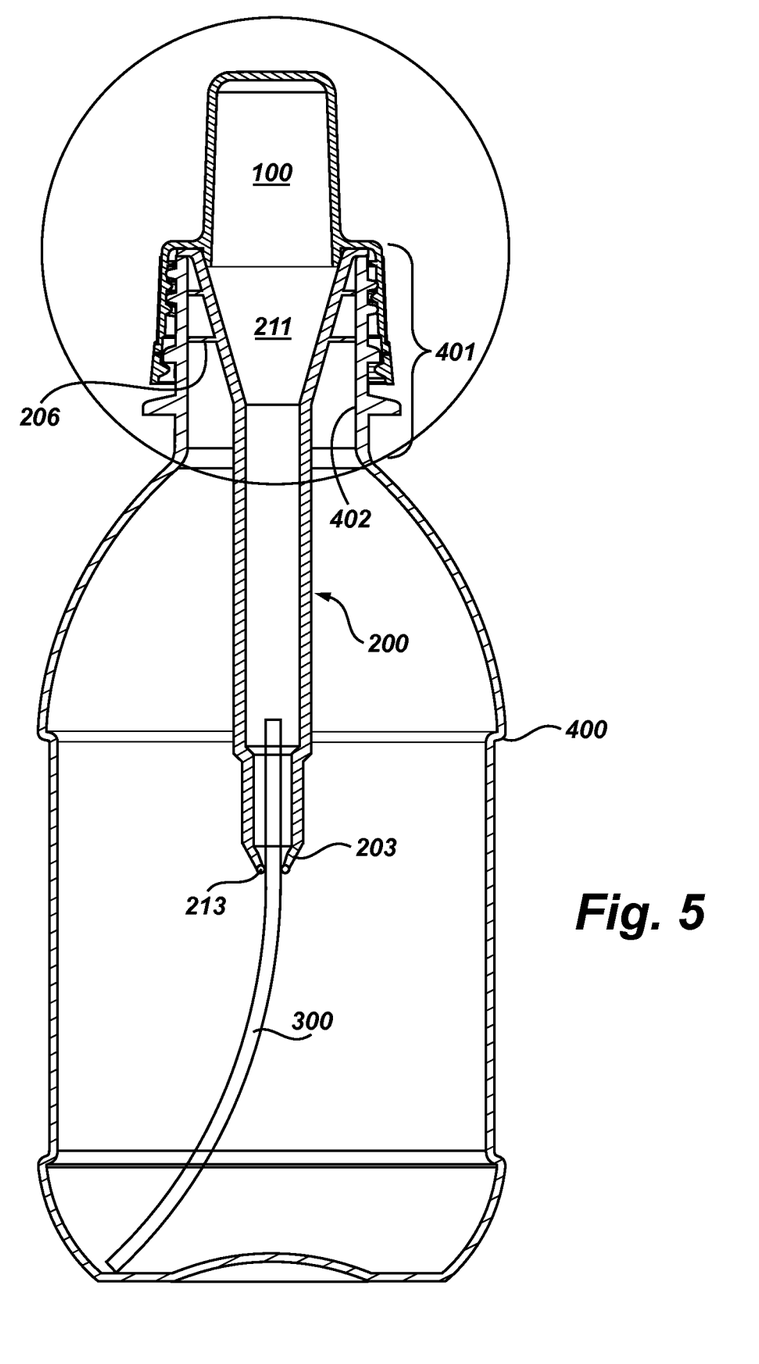
FIG. 5 is a sectional view of one embodiment of the invention used with a bottle cap and bottle.

Referring to FIG. 5, a straw holder 200 is shown in attachment to a cap 100 and bottle 400. The lower guiding member 206 is shown in contact with the inner wall 402 of the bottle. The neck section 401 of the bottle secures the cap 100.

FIG. 5 shows the lower tip 213 of the lower "V" straw retainer section 203. The lower tip 213 presents an alternative position for placement of the center retention flap 500.

Figure 6:
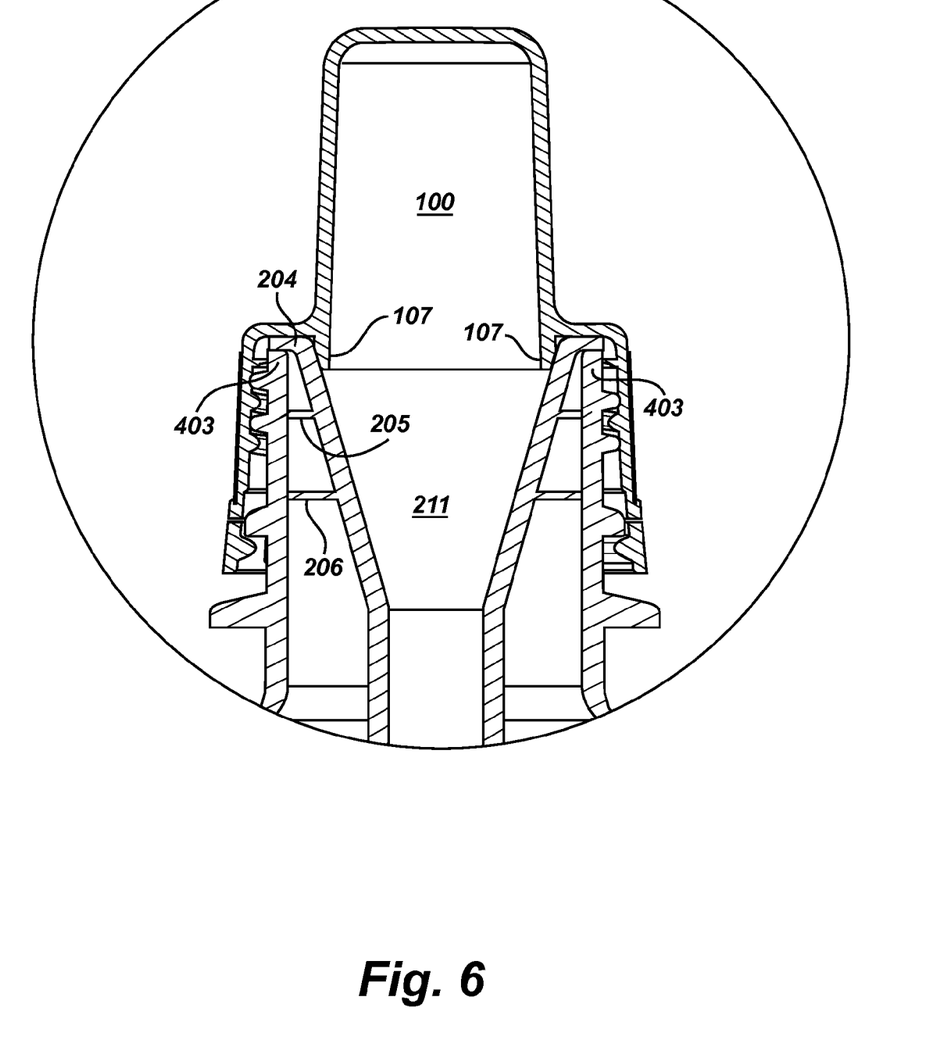
FIG. 6 is an expanded sectional view form FIG. 5.

FIG. 6 presents an expanded view of the bottle neck section 401 and related components. The funnel section 211 of the straw holder is attached to the lower guiding member 206, the middle inner sealing member 205 and the top gasket member 204. The top gasket member 204 is shown resting upon the top lip 403 of the bottle.

Figures 7, 8:
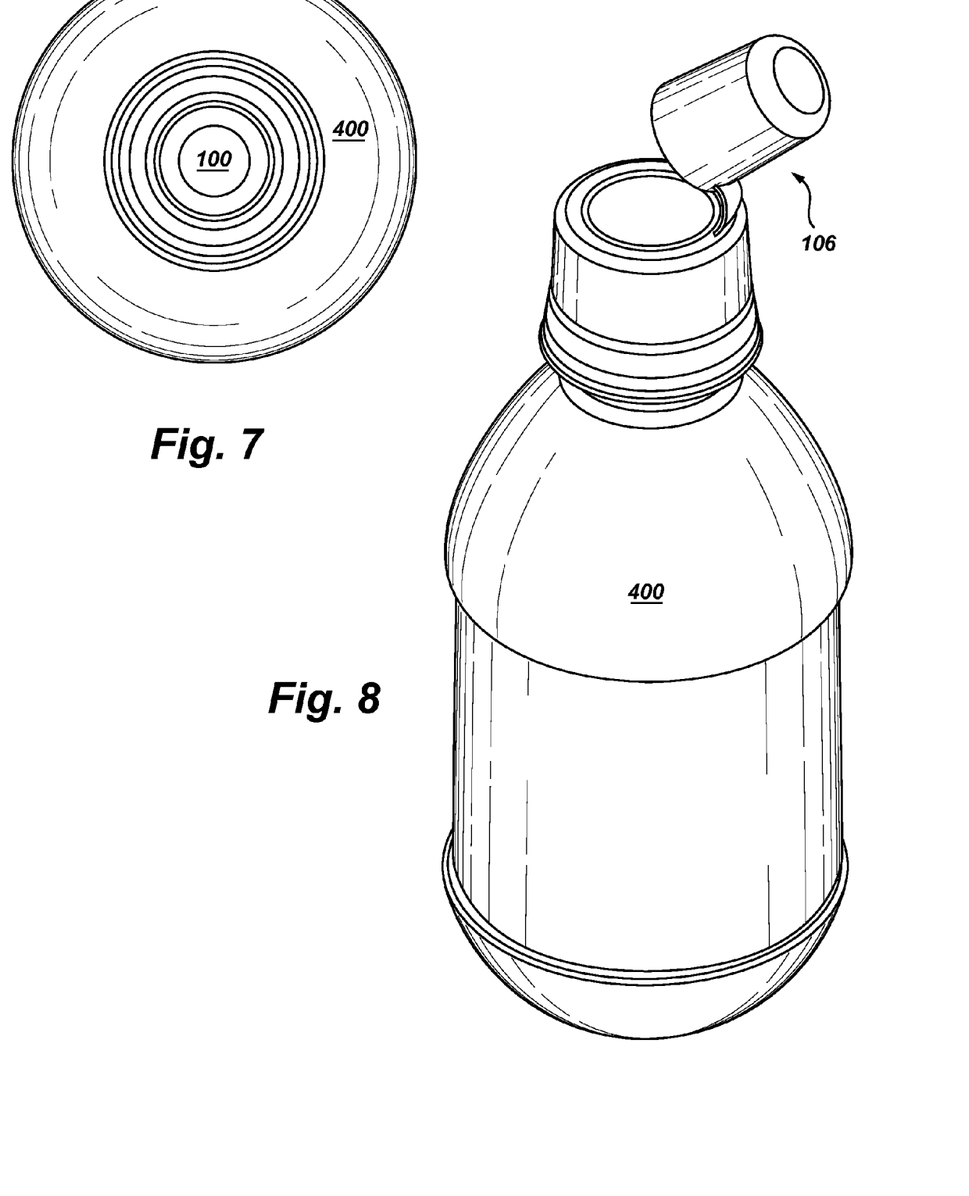
FIG. 7 is a top plan view of one embodiment of the invention.
FIG. 8 is a perspective view of one embodiment of the invention with a flip top cap.

Referring to FIG. 7, a top plan view of the cap 100 and bottle 400 are shown. FIG. 8 shows an alternative embodiment wherein a flip cap 106 is used to house the top sipping section 303 of the upper straw. In the interest of clarity, FIG. 8 is shown without the disclosed straw holder.

Figure 9:
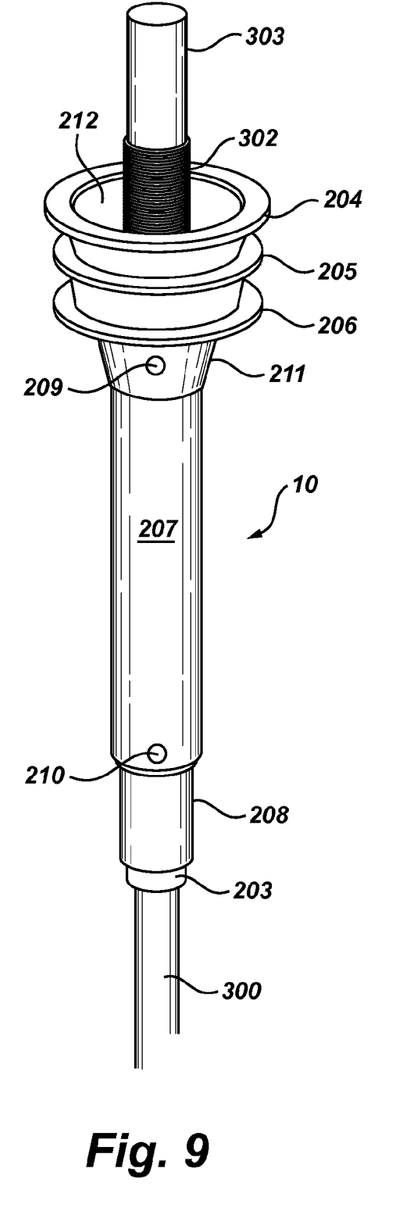
FIG. 9 is a perspective view of the straw holder with a straw inserted.

Referring to FIG. 9 a perspective view of a straw holder and straw sections are shown in an assembled state. This embodiment of the invention is shown generally 10. One or more upper air and fluid voids 209 may be found within the funnel section 211 of the straw holder. The upper air and fluid voids allow air venting to facilitate the flow of fluid through the upper and lower straws and provides drainage for fluid that has passed into the inner area 212 of the funnel section 211. The lower fluid drainage void 210 allows fluid to drain from within the straw holder when the fluid within the bottle is lower than the main shaft 207 of the straw holder.

Figure 10:
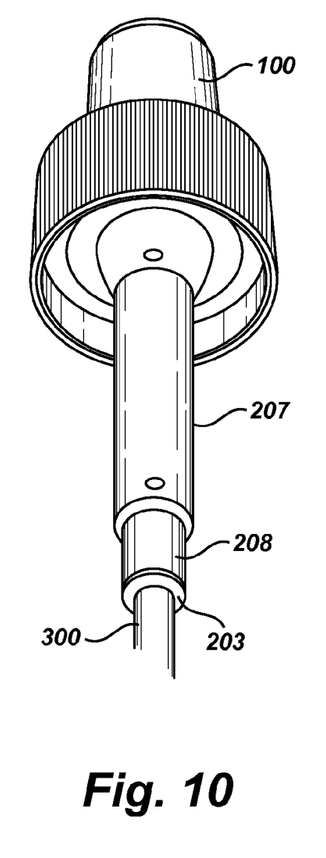
FIG. 10 is a perspective view of a straw holder attached to a bottle cap.

FIG. 10 presents a perspective view of the straw holder used with a cap.

Figure 11:
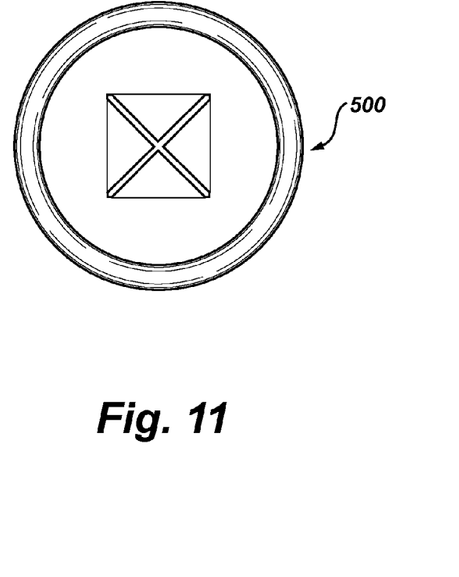
FIG. 11 is a top plan view of a center retention flap plug.

FIG. 11 is a top plan view of center retention flap plug 500. The flap plug 500 presents an alternative embodiment to replace the straw retention system 202 of the straw holder. The flap plug may be used above or below the plug section of the straw holder. In this alternative embodiment, the flap plug 500 may be attached below the funnel section 211 of the straw holder or may be attached within or above the funnel section 211 of the straw holder. The flap plug may be used to center a straw within a bottle. The four quarter flaps 401 of FIG. 14 accept a straw and keep the straw in place.

Figure 12:
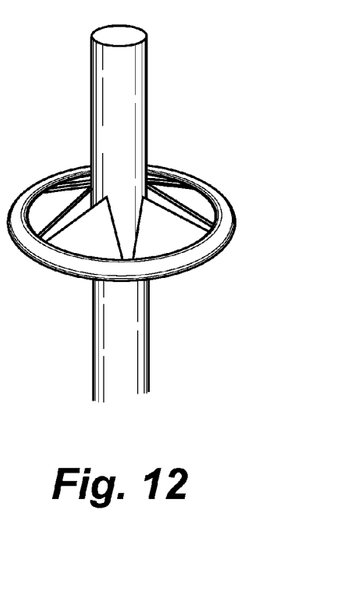
FIG. 12 is a top and side perspective view of a center retention flap plug with a straw inserted.
Figure 13:
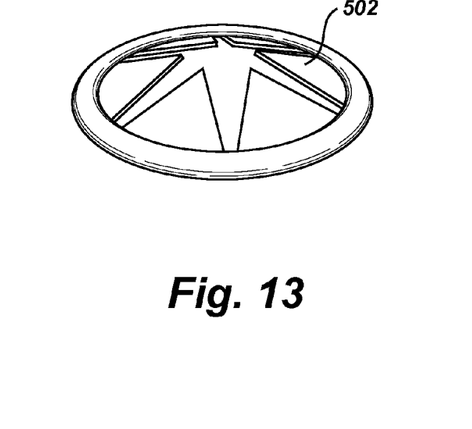
FIG. 13 is a top and side perspective view of a center retention flap plug.
Figure 14:
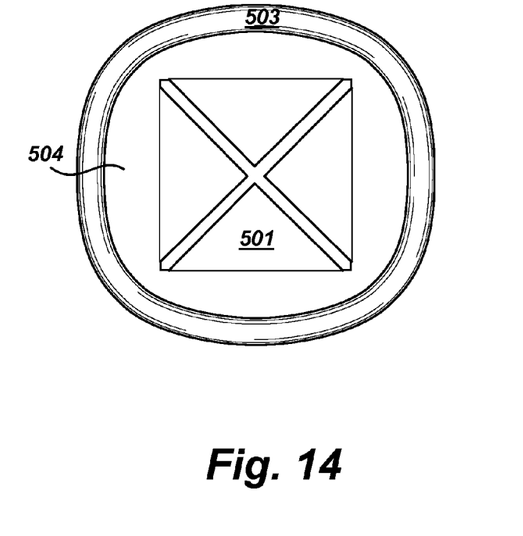
FIG. 14 is a top plan view of a center retention flap plug with voids showing between the quarter flaps.

FIG. 12 shows a straw inserted within a flap plug 500. FIG. 13 shows a side perspective view of a flap plug wherein space is shown between the quarter flaps for purposes of illustration. The void areas 502 of the flap plug occur when a straw is inserted into the quarter flap area. FIG. 14 shows an alternative configuration of a flap plug. The outer ring 503 of the flap plug may be used to secure the flap plug within a bottle.

Unexpected results are achieved by use of the disclosed straw holder 200 in that straws may be secured within most standard bottles and that the straw holder is easily removed and reused in other bottles. The straw holder is unexpectedly easy to re-insert into a bottle by use of the lower guiding member 206 that allows the straw holder to be set upon a bottle and then fully installed by screwing on the cap. The lower guiding member provides a convenient setting mechanism so that force by hand is not needed to install the straw holder 200. The plug section 201 of the straw holder provides firm attachment to the bottle by use of the top gasket member that rests upon the top of the bottle. The top gasket member 204 also provides means of removing the straw holder as user may use a tool or finger to pull the top gasket in an upward direction.

The lower "V" straw retainer 203 section provides a new means of securing an inner lower straw 300 such that the outer upper straw will not pull the inner lower straw out of the container. The inner lower straw is well secured by use of the sub-shaft 208 and "V" straw retainer 203.

Certain aspects of the invention may be explained and described in the following list of items.

Item 1. A straw holder 200 comprising:
a) a plug section 201, the plug section comprising:
i. a hollow funnel section 211 with an outer side and an inner area 212, with the outer side attaching to a top gasket member 204, a middle inner sealing member 205 and a lower guiding member 206, with the lower guiding member having means of centering the straw holder within the middle of a bottle, with the middle inner sealing member 205 having mean of contacting the inner wall area 402 of a neck section 401 of a bottle, and the top gasket member being configured to sit on top of a top lip 403 of a bottle;
b) a straw retention system 202, the straw retention system comprising:
i. a hollow main shaft 207 connected to the bottom portion of the funnel section 211;
ii. a hollow sub-shaft 208 connected to the main shaft, and with the sub-shaft having a smaller inside diameter than the inside diameter of the main shaft; and
iii. a hollow "V" straw retainer section 203 attached to the lower end of the sub-shaft, with the "V" straw retainer section 203 having a smaller inside diameter as compared to the inside diameter of the sub-shaft 208.

Item 2. A straw holder comprising:
a) a plug section 201, the plug section comprising:
i. a hollow funnel section 211 with an outer side and an inner area 212, with the outer side attaching to a top gasket member 204, a middle inner sealing member 205 and a lower guiding member 206, with the lower guiding member having means of centering the straw holder within the middle of a bottle, with the middle inner sealing member 205 having mean of contacting the inner wall area 402 of a neck section 401 of a bottle, and the top gasket member being configured to sit on top of a top lip 403 of a bottle;
b) a center retention flap 500 attached to the bottom of the plug section 201, with the center retention flap comprising a plurality of quarter flaps 501, secured to a quarter flap holder 504 and an outer ring attached to the quarter flap holder.

Item 3. The straw holder of item 2 wherein the center retention flap 500 is attached to the top end of the plug section 201.

Item 4. A kit for retaining a straw within a bottle, the kit comprising:
a) a funnel section 211;
b) a top gasket 204 member;
c) a middle inner sealing 205 member; and
d) a lower guiding member.

Item 5. The kit of item 4 further comprising:
a) a main shaft 207;
b) a sub-shaft 208; and
c) a lower "V" straw retainer 203 section.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A straw holder and bottle cap comprising:
the straw holder comprising:
a)— a plug section, the plug section comprising:
i. a hollow funnel section with an outer side and an inner area, with the outer side attaching to a top gasket member, a middle inner sealing member and a lower guiding member, with the lower guiding member having means of centering the straw holder within a middle area of a bottle, with the middle inner sealing member having means of contacting an inner wall area of a neck section of a bottle, and the top gasket member being configured to sit on top of a top lip of a bottle and the top gasket member having a larger circumference as compared to a top lip section of a bottle;
b) a straw retention system, the straw retention system comprising:
i. a hollow main shaft connected to a bottom portion of the funnel section;
ii. a hollow sub-shaft connected to the main shaft, and with the sub-shaft having a smaller inside diameter than an inside diameter of the main shaft;
iii. a hollow "V" straw retainer section attached to a lower end of the sub-shaft, with the "V" straw retainer section having a smaller inside diameter as compared to the inside diameter of the sub-shaft;
iv. the funnel section having a void;
v. the main shaft having a void;
vi. an inner lower straw having a top end secured by the "V" straw retainer section and the inner lower straw having a bottom end extending below the "V" straw retainer section;
vii. a top cap securing the top gasket member to the top lip section of a bottle;
the bottle cap comprising:
c) an inner cap seal member attached to a shoulder section with the shoulder section comprising a rest area and a cap shelf plate.

2. A kit for retaining a straw within a bottle, the kit comprising:
a straw holder comprising:
a) a plug section, the plug section comprising:
i. a hollow funnel section with an outer side and an inner area, with the outer side attaching to a top gasket member, a middle inner sealing member and a lower guiding member, with the lower guiding member having means of centering the straw holder within a middle area of a bottle, with the middle inner sealing member having means of contacting an inner wall area of a neck section of a bottle, and the top gasket member being configured to sit on top of a top lip of a bottle and the top gasket member having a larger circumference as compared to a top lip section of a bottle;

b) a straw retention system, the straw retention system comprising:
  i. a hollow main shaft connected to a bottom portion of the funnel section;
  ii. a hollow main shaft connected to the main shaft, and with the sub-shaft having a smaller inside diameter than an inside diameter of the main shaft;
  iii. a hollow "V" straw retainer section attached to a lower end of the sub-shaft, with the "V" straw retainer section having a smaller inside diameter as compared to the inside diameter of the sub-shaft;
  iv. the funnel section having a void;
  v. the main shaft having a void;
  vi. an inner lower straw having a top end secured by the "V" straw retainer section and the inner lower straw having a bottom end extending below the "V" straw retainer section;

b) a bottle cap comprising:
  an inner cap seal member attached to a shoulder section with the shoulder section comprising a rest area and a cap shelf plate, with the inner cap seal member and the shoulder section configured to constrain the top gasket member between the top lip section of the bottle and shoulder section.

3. The kit of claim 2 wherein the top gasket member is replaced with a center retention flap.

4. The kit claim 2 wherein a top cap secures the top gasket member to the top lip section of a bottle.

5. The kit of claim 4 wherein the top cap has an inner cap seal member that further secures the top gasket member to a bottle.

6. A method of securing a straw holder assembly, the method comprising the steps of:
  a) constructing a plug section by use of:
    a hollow funnel section with an outer side and an inner area, with the outer side attaching to a top gasket member, a middle inner sealing member and a lower guiding member, with the lower guiding member having means of centering the straw holder within a middle area of a bottle, with the middle inner sealing member having means of contacting an inner wall area of a neck section of a bottle, and the top gasket member being configured to sit on top of a top lip of a bottle and the top gasket member having a larger circumference as compared to a top lip section of a bottle;
  b) a straw retention system, the straw retention system comprising:
    i. a hollow main shaft connected to a bottom portion of the funnel section;
    ii. a hollow sub-shaft connected to the main shaft, and with the sub-shaft having a smaller inside diameter than an inside diameter of the main shaft;
    iii. a hollow "V" straw retainer section attached to a lower end of the sub-shaft, with the "V" straw retainer section having a smaller inside diameter as compared to the inside diameter of the sub-shaft;
    iv. the funnel section having a void;
    v. the main shaft having a void;
    vi. an inner lower straw having a top end secured by the "V" straw retainer section and the inner lower straw having a bottom end extending below the "V" straw retainer section;
  b) constructing a bottle cap having an inner cap seal member attached to a shoulder section with the shoulder section comprising a rest area and a cap shelf plate; and pressing the top gasket member into the shoulder section.

7. The method of claim 6 further comprising the step of using a center retention flap in place of a top gasket member.

* * * * *